(12) United States Patent
Shimada et al.

(10) Patent No.: US 6,661,644 B2
(45) Date of Patent: Dec. 9, 2003

(54) CAPACITOR (75) Inventors: Mikinari Shimada, Yawata (JP); Emiko Igaki, Amagasaki (JP); Tsunenori Yoshida, Yawata (JP); Masakazu Tanahashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/265,208

(22) Filed: Oct. 4, 2002

(65) Prior Publication Data

US 2003/0103320 A1 Jun. 5, 2003

(30) Foreign Application Priority Data

Oct. 5, 2001 (JP) ........................................ 2001-309582

(51) Int. Cl.⁷ .................................................. H01G 9/04
(52) U.S. Cl. ......................... 361/508; 361/516; 361/517
(58) Field of Search ................................. 361/523, 524, 361/528–530, 531, 532, 533, 535, 541

(56) References Cited

U.S. PATENT DOCUMENTS

| 5,473,503 | A |   | 12/1995 | Sakata et al. |
| 5,621,608 | A |   | 4/1997  | Arai et al. |
| 5,930,109 | A | * | 7/1999  | Fishler ........................ 361/508 |
| 6,110,234 | A |   | 8/2000  | Sakata et al. |
| 6,185,091 | B1 |  | 2/2001  | Tanahashi et al. |
| 6,224,639 | B1 |  | 5/2001  | Hamada et al. |
| 6,262,878 | B1 |  | 7/2001  | Shirashige et al. |

FOREIGN PATENT DOCUMENTS

| EP | 1 050 888 | 11/2000 |
| JP | 61-183524 | 11/1986 |
| JP | 6-267802 | 9/1994 |
| JP | 7-201671 | 8/1995 |
| JP | 9-129512 | 5/1997 |
| JP | 2765462 | 4/1998 |
| JP | 11-288846 | 10/1999 |
| JP | 2000-058376 | 2/2000 |
| JP | 2000-215729 | 8/2000 |
| JP | 2001-006978 | 1/2001 |
| JP | 2001-155952 | 6/2001 |

* cited by examiner

Primary Examiner—Anthony Dinkins
(74) Attorney, Agent, or Firm—Merchant & Gould, P.C.

(57) ABSTRACT

A capacitor is provided, in which an anode and a cathode are led out in a same direction, whereby ESL and ESR are lowered at high frequencies. This capacitor includes for example: anodes and cathodes that are laminated alternately with at least a dielectric layer intervening therebetween; at least one anode leading-out portion; at least one cathode leading-out portion; an anode terminal; and a cathode terminal. In this capacitor, the anodes are connected electrically to the at least one anode leading-out portion, and the cathodes are connected electrically to the at least one cathode leading-out portion. The at least one anode leading-out portion and the at least one cathode leading-out portion are led out in a predetermined direction. The at least one anode leading-out portion is connected to the anode terminal and the at least one cathode leading-out portion is connected to the cathode terminal.

19 Claims, 9 Drawing Sheets

CAPACITOR

BACKGROUND OF THE INVENTION

1. Field of the Invention

The present invention relates to a multilayer capacitor that is used on the secondary side of a power supply smoothing circuit and on the periphery of a CPU of a computer. More particularly, the present invention relates to a capacitor having small equivalent series inductance (hereinafter referred to as "ESL") and small equivalent series resistance (hereinafter referred to as "ESR") at high frequencies.

2. Related Background Art

Recently, with the digitization of electronic equipment, miniaturized capacitors having larger capacitance at high frequencies used for the electric equipment have been strongly demanded. To meet this demand, multilayer chip capacitors are suitable in terms of low ESR and multilayer solid electrolytic capacitors are suitable in terms of low ESR and large capacitance. However, in addition to lowering ESR by further increasing capacitance per volume, it has been desired that ESL due to external connection terminals of a capacitor be decreased further.

JP 2000-58376 A discloses a capacitor having a three-terminal structure, where a first anode terminal and a second anode terminal, which are connected to an anode, are provided on two opposed side surfaces of the capacitor, and a cathode terminal connected to a cathode is provided on another side so as to lower the ESL. JP 2001-155952 A discloses a capacitor having a three-terminal structure, where a first anode terminal and a second anode terminal, which are connected to an anode, are provided on a top surface of the capacitor and a cathode terminal connected to a cathode is provided on a bottom surface so as to lower the ESL and the ESR.

Figure 8A:
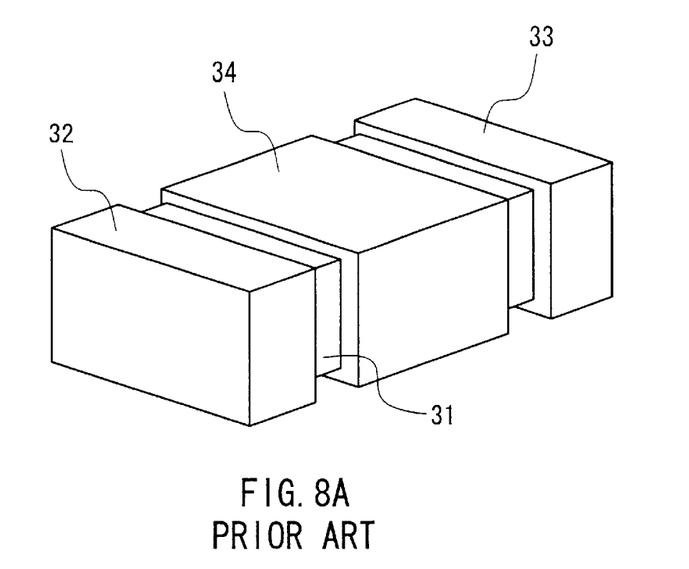
FIG. 8A is a perspective view of a conventional multilayer capacitor.
Figure 8B:
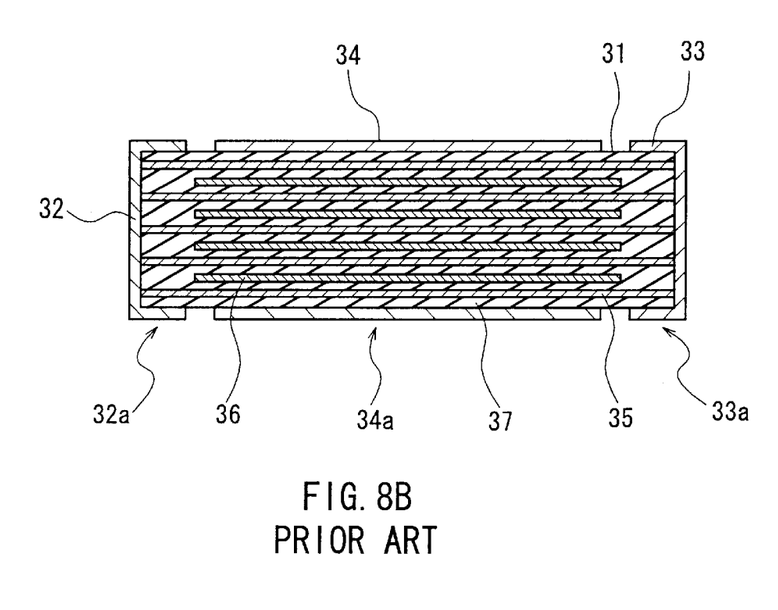
FIG. 8B is a cross-sectional view of the capacitor.

The following describes conventional multilayer capacitors, with reference to FIGS. 8A and 8B and FIGS. 9A and 9B. FIG. 8A is a perspective view showing the appearance of one example of the conventional multilayer capacitors, and FIG. 8B is a cross-sectional view of the capacitor.

As shown in FIG. 8A, on each of both opposed side surfaces of a ceramic dielectric block 31, a first electrode terminal 32 or a second electrode terminal 33 is formed, and a third electrode terminal 34 is formed on a surface other than the above surfaces. As shown in FIG. 8B, inside of the ceramic dielectric block 31, anodes 35 and cathodes 36 are laminated, between which a ceramic dielectric 37 intervenes. Edges of the anodes 35 on one side are connected collectively to the first electrode terminal 32, and edges on the other side are connected collectively to the second electrode terminal 33. The cathodes 36 are collected at a side that is not illustrated in the drawing and are connected to the third electrode terminal 34.

Such a multilayer capacitor is connected to a circuit board by connecting a bottom surface 32a of the first electrode terminal 32, a bottom surface 33a of the second electrode terminal 33 and a bottom surface 34a of the third electrode terminal 34 to the respective land patterns on the circuit board.

Figure 9A:
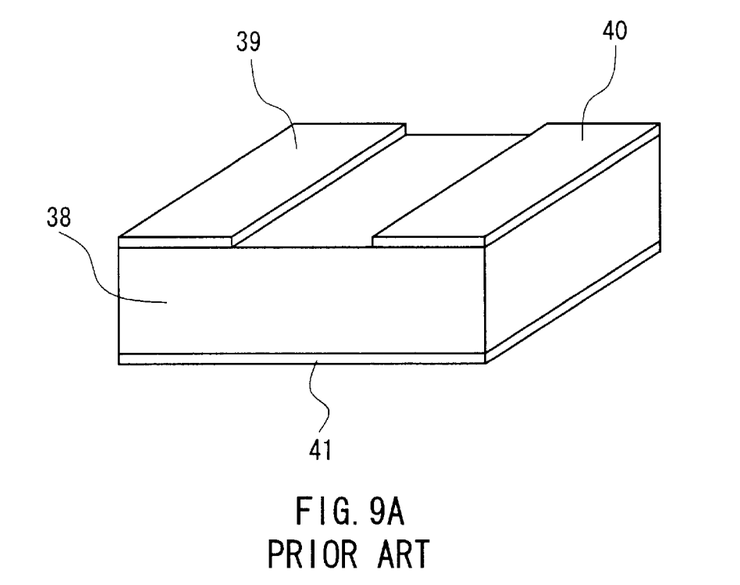
FIG. 9A is a perspective view of another conventional multilayer capacitor.
Figure 9B:
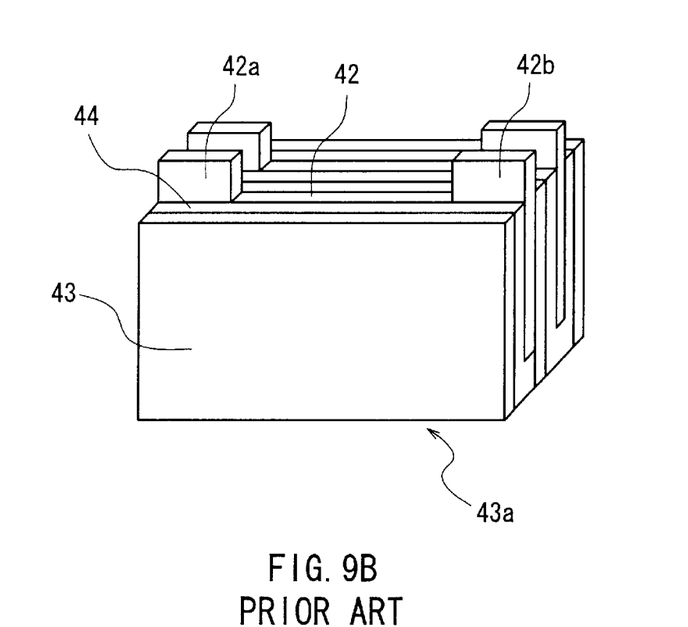
FIG. 9B is a perspective view showing a construction of electrodes of the capacitor.

FIG. 9A is a perspective view showing the appearance of another example of the conventional multilayer capacitors, and FIG. 9B is a perspective view showing a construction of electrodes of the capacitor. As shown in FIG. 9A, a first electrode terminal 39 and a second electrode terminal 40 are formed on a top surface of a ceramic dielectric block 38, and a third electrode terminal 41 is formed on a bottom surface thereof. As shown in FIG. 9B, anodes 42 and cathodes 43 are laminated, between which a ceramic dielectric 44 intervenes. First and second anode leading-out portions 42a and 42b are formed on a top side of the anode 42, and a bottom side of the cathode 43 is used for a cathode leading-out portion 43a. The first anode leading-out portion 42a, the second anode leading-out portion 42b and the cathode leading-out portion are connected to the first electrode terminal 39, the second electrode terminal 40 and the third electrode terminal 41, respectively.

The multilayer capacitor shown in FIGS. 9A and 9B is intended to be embedded in a multilayered print board formed by laminating a plurality of wiring layers. The first electrode terminal 39 and the second electrode terminal 40 are connected to a wiring conductor of upper wiring layers and the third electrode terminal 41 is connected to a wiring conductor of lower wiring layers.

As described above, conventionally, multilayer capacitors having three or more terminals are used for realizing low ESL and low ESR at high frequencies. In these capacitors, inductance is lowered by passing a current inside of a capacitor efficiently and by making an anode and a cathode function as a circuit wiring.

However, since all of the multilayer capacitors used at high frequencies have three or more terminals, their structure is complicated and a circuit wiring has to be designed depending on the number of terminals.

On the other hand, in order to lower the ESL with a two-terminal structure, efforts have been made only for reducing the size until now, and a multilayer capacitor that can realize low ESL and large capacitance at the same time has not been provided.

SUMMARY OF THE INVENTION

In the present invention, an anode and a cathode are led out in a same direction. According to one aspect of the present invention, a capacitor includes: anodes and cathodes that each are laminated alternately with at least a dielectric layer intervening therebetween; at least one anode leading-out portion; at least one cathode leading-out portion; an anode terminal; and a cathode terminal. The anodes are connected electrically to the at least one anode leading-out portion, and the cathodes are connected electrically to the at least one cathode leading-out portion. The at least one anode leading-out portion and the at least one cathode leading-out portion are led out in a predetermined direction. The at least one anode leading-out portion is connected to the anode terminal and the at least one cathode leading-out portion is connected to the cathode terminal.

DETAILED DESCRIPTION OF THE INVENTION

According to a capacitor of the present invention, at least one anode leading-out portion and at least one cathode leading-out portion are led out in a same direction, and therefore an anode terminal and a cathode terminal can be arranged adjacent to each other. As a result, even in the case of two terminals, a miniaturized capacitor having large capacitance at high frequencies and having lowered ESL and lowered ESR can be provided.

The effects obtained by arranging the anode terminal and the cathode terminal adjacent to each other can be obtained also in a capacitor having three or more terminals. When applying the present invention to a capacitor having four terminals, for example, the capacitor includes: anodes and cathodes that each are laminated alternately with at least a dielectric layer intervening therebetween; at least one first anode leading-out portion; at least one second anode leading-out portion; at least one first cathode leading-out portion; at least one second cathode leading-out portion; a first anode terminal; a second anode terminal; a first cathode terminal; and a second cathode terminal. The anodes are connected electrically to the at least one first anode leading-out portion and the at least one second anode leading-out portion, and the cathodes are connected electrically to the at least one first cathode leading-out portion and the at least one second cathode leading-out portion. The at least one first anode leading-out portion, the at least one second anode leading-out portion, the at least one first cathode leading-out portion and the at least one second cathode leading-out portion are led out in a predetermined direction. The at least one first anode leading-out portion is connected to the first anode terminal, the at least one second anode leading-out portion is connected to the second anode terminal, the at least one first cathode leading-out portion is connected to the first cathode terminal and the at least one second cathode leading-out portion is connected to the second cathode terminal.

The anode terminal and the cathode terminal may be exposed at least from a predetermined surface of the surfaces of the capacitor. In the case of four terminals, it is preferable that the first and the second anode terminals and the first and second cathode terminals are all exposed from the predetermined surface.

In the capacitor, at least one terminal selected from the anode terminal and the cathode terminal may be formed so as to extend from the predetermined surface to an adjacent surface that is adjacent to the predetermined surface. With this terminal arrangement, the close-adhesion strength of the terminals can be enhanced and the bonding strength of the capacitor can be increased when the capacitor is mounted.

Furthermore, the flexibility of the design for a land pattern on a circuit board can be improved. In the case of four terminals, at least one terminal selected from the first anode terminal, the second anode terminal, the first cathode terminal and the second cathode terminal may be formed so as to extend from a predetermined surface to an adjacent surface.

The electrode leading-out portions (the anode leading-out portion and the cathode leading-out portion) should be connected electrically to the electrodes (the anode and the cathode). The electrode leading-out portions may be formed by elongating a portion of the electrodes or by connecting a member, which is prepared separately, to the electrodes.

When the anodes and the cathodes are flat plates having principal surfaces in a predetermined shape (e.g., rectangle), a portion of an edge surface of the flat plate may protrude in the predetermined direction so as to form the anode leading-out portion and the cathode leading-out portion. In the case of four terminals, two portions of an edge surface of a flat plate may protrude in the predetermined direction so as to form a first anode leading-out portion and a second anode leading-out portion or a first cathode leading-out portion and a second cathode leading-out portion.

In this case, it is preferable that the anode leading-out portion and the cathode leading-out portion, in the case of four terminals, the first anode terminal, the second anode terminal, the first cathode terminal and the second cathode terminal, are led out so as not to overlap with each other, when viewed from a direction perpendicular to the principal surface. This facilitates the arrangement of electrode terminals.

The capacitor according to the present invention may be a ceramic capacitor, i.e., a multilayer ceramic capacitor, or may be a multilayer solid electrolytic capacitor. Especially in the latter case, preferably the capacitor is configured so that the anodes and the cathodes are put inside of a container having an opening, from which the anode leading-out portion and the cathode leading-out portion are led out. Preferably, this opening is sealed with a material containing a resin, and particularly it is preferable to seal the opening so that space is left inside of the container. In the case of so-called moisture absorption reflow, water inside of the capacitor element might evaporate, which increases the internal pressure. If space exists inside of the container, the explosion of the container can be suppressed even in the case of an increase in the internal pressure.

In the case of a multilayer solid electrolytic capacitor, the anodes and the cathodes are each laminated alternately with at least a solid electrolyte layer as well as the dielectric layer intervening therebetween. In this case, the capacitor may be configured so that each of the anodes has a pair of principal surfaces, on each of which the dielectric layer is formed. The solid electrolyte layer is formed to be in contact with the dielectric layer and on each of the pair of the principal surfaces via the dielectric layer. Each of the cathodes is arranged so as to be connected electrically to the solid electrolyte layer. A plurality of unit elements, each being made up of the anode, the dielectric layer, the solid electrolyte layer and the cathode, are laminated. Note here that the solid electrolyte layer and the cathode may be connected directly, or may be connected electrically via a cathode conductive layer and the like.

In the present invention, the number of the electrode leading-out portion may be one or two or more, and the electrode leading-out portion may be provided for each electrode. In the case of a multilayer solid electrolytic capacitor, in which the unit elements are laminated, the configuration of the at least one cathode leading-out portion may be simplified by forming a single member that is connected to the cathodes that constitute the plurality of unit elements. In this case, in order to lead out the anode leading-out portions in the same direction as that of the cathode leading-out portion, the anode leading-out portions might have to have a bend to be led out. The anode leading-out portions, for example, firstly are elongated in a direction where the solid electrolyte layer is not formed and then are formed to have a bend at the right angle, i.e., in an L shape, to be led out.

The present invention is applicable also to a capacitor in which an anode and a cathode are not laminated alternately. This capacitor, for example, includes: a plurality of unit elements that are laminated, where each of the unit elements includes an anode having a pair of principal surfaces, a dielectric layer formed on each of the pair of principal surfaces and a solid electrolyte layer formed on each of the pair of principal surfaces via the dielectric layer; anode leading-out portions; and a cathode leading-out portion. The anodes are connected electrically to the anode leading-out portions and the solid electrolyte layers are connected electrically to the cathode leading-out portion. In this capacitor also, the anode leading-out portions and the cathode leading-out portion are led out in a predetermined direction, and the anode leading-out portions are connected to an anode terminal, and the cathode leading-out portion is connected to a cathode terminal.

In this capacitor also, the anode leading-out portions may be formed to have a bend in an L shape to be led out.

The following describes embodiments of the present invention, with reference to the drawings.

Embodiment 1

Figure 1A:
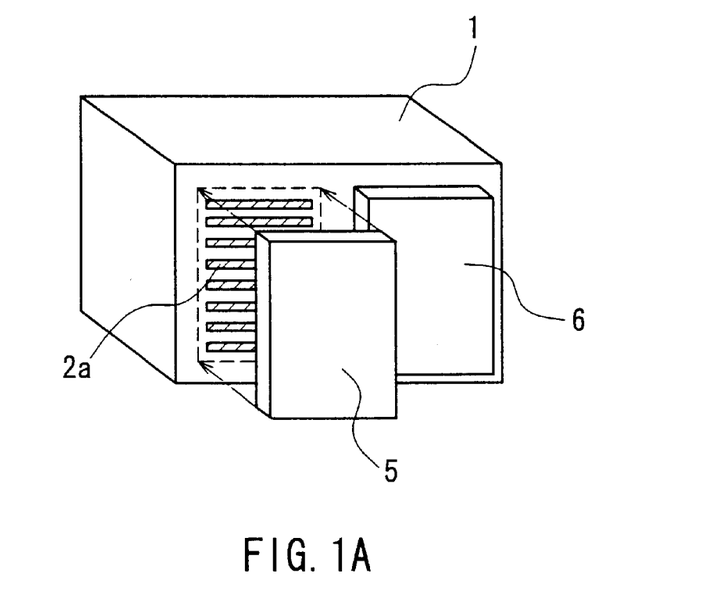
FIG. 1A is a perspective view of a capacitor according to Embodiment 1 of the present invention.
Figure 1B:
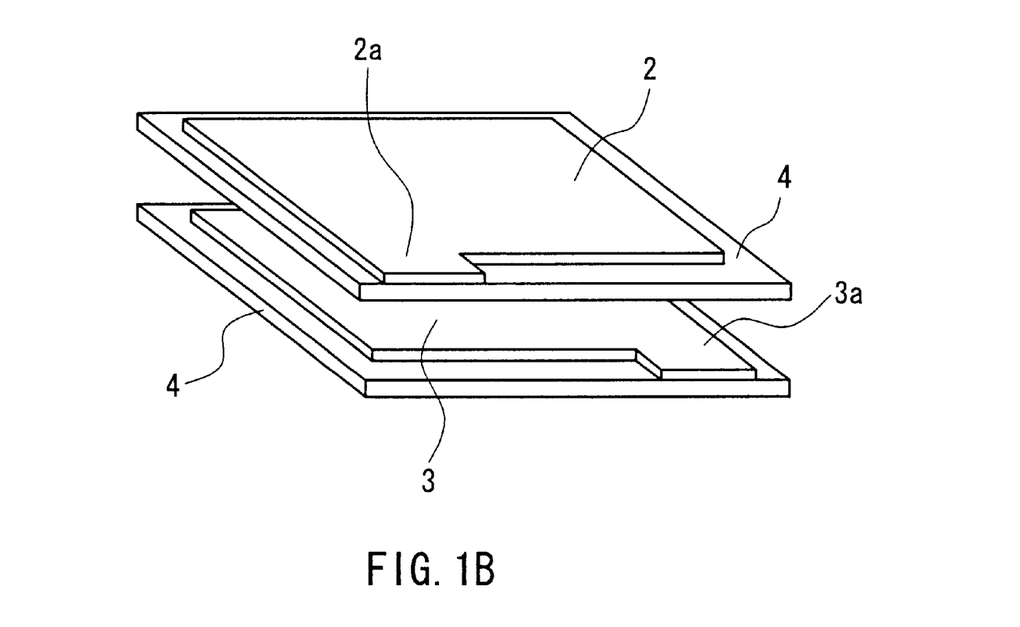
FIG. 1B is a perspective view showing a construction of electrodes of the capacitor.

FIG. 1A is a perspective view showing the appearance of a capacitor having two terminals according to Embodiment 1 of the present invention. This drawing shows a virtual state where an anode terminal 5 is separated from the capacitor 1. FIG. 1B is a perspective view showing a construction of electrodes of the capacitor.

As in the case of the conventional multilayer ceramic capacitors, in the capacitor 1 according to Embodiment 1, anodes 2 and cathodes 3 are laminated with a dielectric layer 4 intervening therebetween. Anode leading-out portions 2a, which are exposed from one surface, are connected collectively to the anode terminal 5 and cathode leading-out portions 3a are connected collectively to a cathode terminal 6.

On one surface of a ceramic green sheet serving as the dielectric layer 4, the anode 2 and the anode leading-out portion 2a are formed by, for example, printing an electroconductive paste. On one surface of another ceramic green sheet, the cathode 3 and the cathode leading-out portion 3a are formed. The electrode leading-out portions 2a and 3a are formed by making a portion of one side of the electrodes 2 and 3 protrude outward.

The dielectric layers 4, on which these electrodes are formed, are laminated so that the electrode leading-out portions 2a and 3a protrude in a same direction, and are subjected to a procedure for removing a binder and baking. By leading out the anode leading-out portion 2a and the cathode leading-out portion 3a in the same direction, electrode terminals are adjacent to each other, so that low ESL can be realized. The dielectric layer 4 on which the anode leading-out portion 2a is formed and the dielectric layer 4 on which the cathode leading-out portion 3a is formed are laminated alternately with each other so as to keep the anode leading-out portion 2a and the cathode leading-out portion 3a from overlapping.

The anode leading-out portion 2a and the cathode leading-out portion 3a may be formed by connecting a member, which is prepared separately, to the electrodes.

In this capacitor, the anode terminal 5 and the cathode terminal 6 are arranged adjacent to each other on one surface of the capacitor. When mounting this capacitor on a circuit board, the capacitor may be connected so that the surface on which both of the terminals 5 and 6 formed coincides with land on the circuit board. As a result of such connection, the mounted area can be reduced.

Figure 2A:
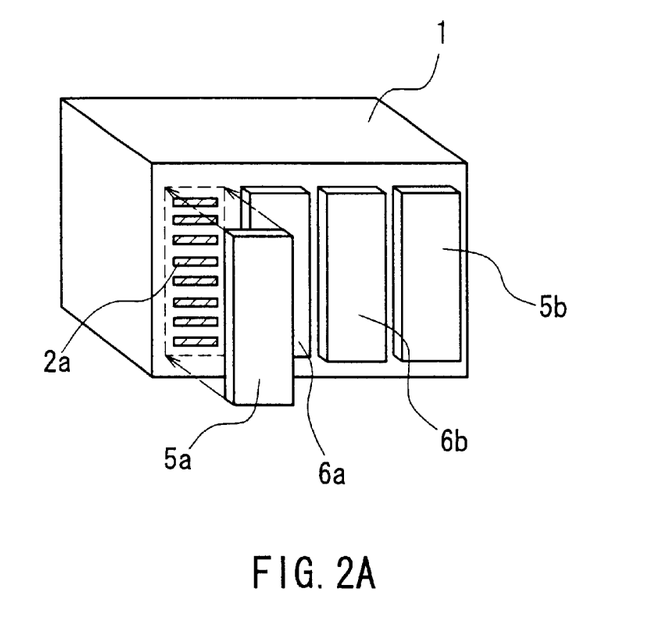
FIG. 2A is a perspective view of another capacitor according to Embodiment 1 of the present invention.
Figure 2B:
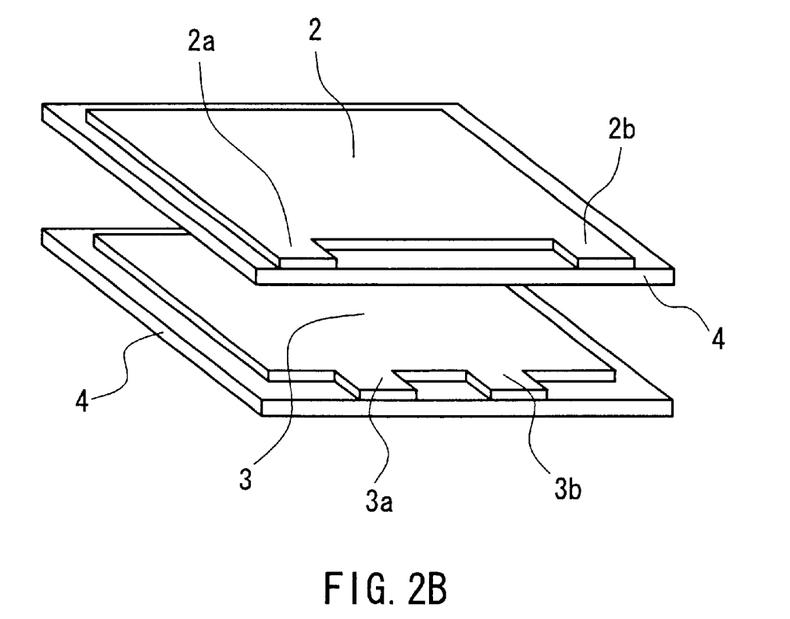
FIG. 2B is a perspective view showing a construction of electrodes of the capacitor.

FIG. 2A is a perspective view showing the appearance of a capacitor having four terminals according to Embodiment 1 of the present invention, and FIG. 2B is a perspective view showing a construction of electrodes of the capacitor.

In this capacitor 1, a first anode terminal 5a, a second anode terminal 5b, a first cathode terminal 6a and a second cathode terminal 6b are exposed from one surface of the capacitor 1. First anode leading-out portions 2a are connected collectively to the first anode terminal 5a, and other electrode leading-out portions are connected to their respective electrode terminals.

This capacitor also is manufactured by forming an anode 2, a first anode leading-out portion 2a and a second anode leading-out portion 2b on a surface of a ceramic green sheet serving as a dielectric layer 4 by, for example, printing an electroconductive paste. On a surface of another green sheet, a cathode 3, a first cathode leading-out portion 3a and a second cathode leading-out portion 3b are formed.

The dielectric layers 4, on which the electrodes 2 and 3 are formed, are laminated so that their electrode leading-out portions 2a, 2b, 3a and 3b are same in direction, and are subjected to a procedure for removing a binder and baking.

Also when mounting this capacitor on a circuit board, the capacitor may be connected so that the surface on which the first anode terminal 5a, the second anode terminal 5b, the first cathode terminal 6a and the second cathode terminal 6b are formed coincides with land on the circuit board. It is preferable that this four-terminal capacitor is mounted on the circuit board so that the anode 2 and the cathode 3 constitute a part of a conductive wiring. In this case, when feeding a current into the capacitor so that the current flows in opposite directions between the anode 2 and the cathode 3, a further lowered ESL can be realized.

Figure 3A:
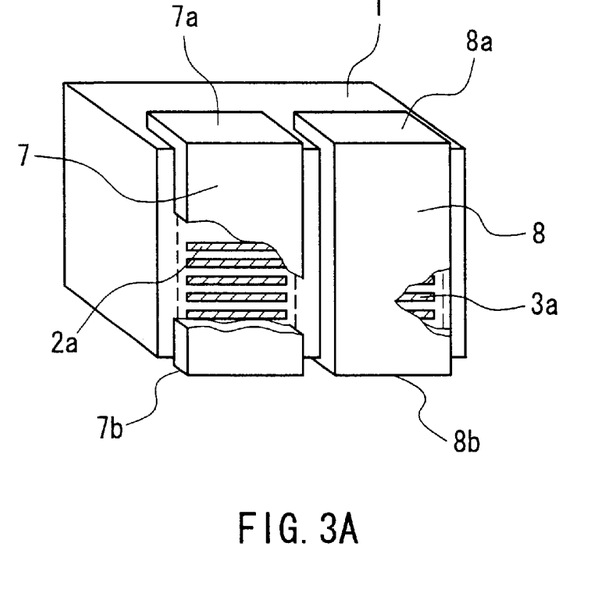
FIG. 3A is a perspective view showing an electrode terminal according to Embodiment 1 of the present invention.
Figure 3B:
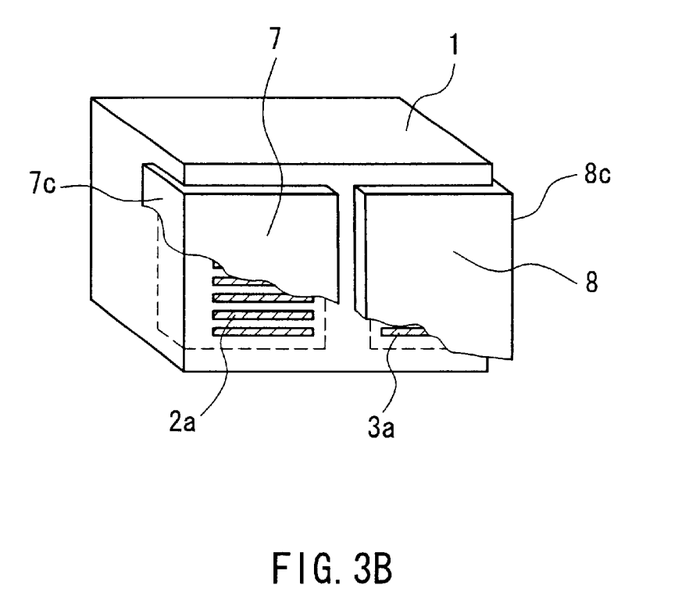
FIG. 3B is a perspective view showing another electrode terminal according to Embodiment 1 of the present invention.

FIGS. 3A and 3B are perspective views showing two modification examples of electrode terminals in the capacitor according to Embodiment 1. In these capacitors, electrode terminals 7 and 8 (anode terminal and cathode terminal, respectively) provided with electrode extended portions 7a to 7c and 8a to 8c are formed. In the capacitor of FIG. 3A, the electrode terminals 7 and 8 have a bend so as to extend in parallel with each other from the surface from which electrode leading-out portions 2a and 3a are led out to adjacent surfaces. On these adjacent surfaces, the extended portions 7a, 7b, 8a and 8b are formed. In the capacitor of FIG. 3B, the electrode terminals 7 and 8 have a bend to extend away from each other in the opposite directions from a surface from which the electrode terminals 7 and 8 are led out to adjacent surfaces. On these adjacent surfaces, extended portions 7c and 8c are formed.

As for both of these capacitors, electrode terminals are formed on two or more surfaces.

Regarding a shape of the electrode terminals, one of the two extended portions in FIG. 3A may be deleted, and the shapes shown in FIGS. 3A and 3B may be combined.

In the capacitor shown in FIGS. 2A and 2B, the configuration shown in FIG. 3A may be applied to the electrode terminals 6a and 6b, and the configuration shown in FIG. 3B or the combination of the configurations shown in FIGS. 3A and 3B may be applied to the electrode terminals 5a and 5b.

With this configuration, where the electrodes 7 and 8 are formed to extend over adjacent surfaces, the flexibility of the design for land on a circuit board on which the capacitor is mounted is increased and the bonding strength of the capacitor to the land can be ensured easily. This capacitor may be connected with the land only at the extended portions of the electrode terminals or at both of the electrode terminals positioned on the leading surface and the extended portions.

Embodiment 2

Figure 4A:
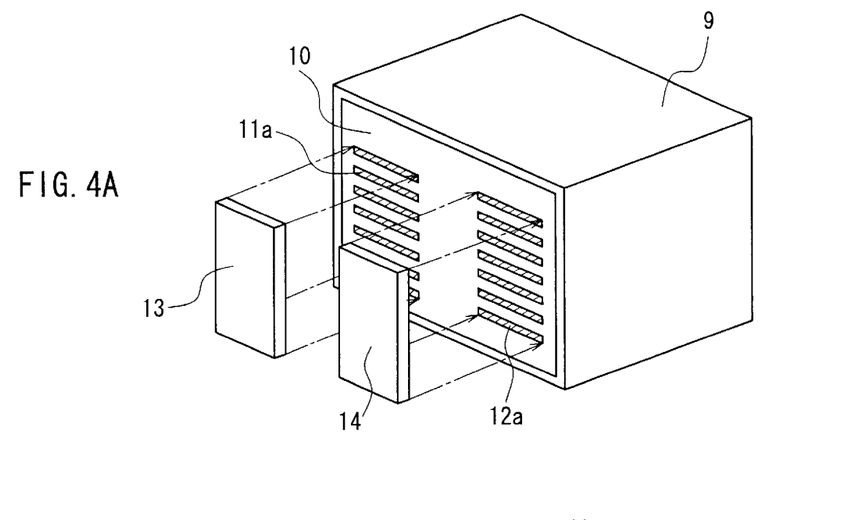
FIG. 4A is a perspective view of a capacitor according to Embodiment 2 of the present invention.
Figure 4B:
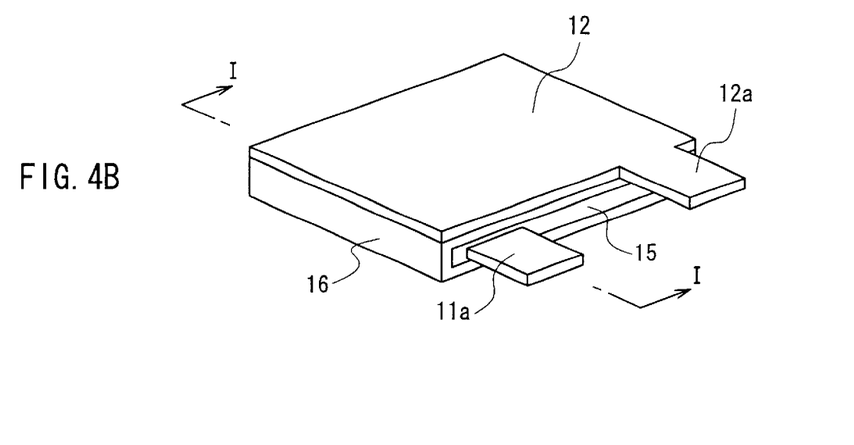
FIG. 4B is a perspective view showing a construction of electrodes of the capacitor.
Figure 4C:
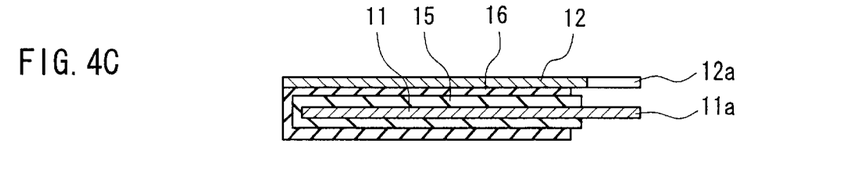
FIG. 4C is a cross-sectional view taken along the line I—I of FIG. 4B.

FIG. 4A is a perspective view showing the appearance of a capacitor according to Embodiment 2 of the present invention. For the sake of clarity, this drawing shows a virtual state where an anode terminal 13 and a cathode terminal 14 are displaced. FIG. 4B is a perspective view showing a construction of electrodes of the capacitor and FIG. 4C is a cross-sectional view taken along the line I—I of FIG. 4B.

In this capacitor, electrolytic capacitors (FIG. 4B), each being a unit element, are laminated. The electrolytic capacitors are laminated so that an anode leading-out portion 11a and a cathode leading-out portion 12a are in the same direction and are arranged in a container 9. An opening of the container is sealed with a resin 10. The anode leading-out portions 11a are connected collectively to the anode terminal 13 and the cathode leading-out portions 12a are connected collectively to the cathode terminal 14.

In each of the electrolytic capacitors, a dielectric layer 15 made of an anodic oxidation coating is formed on a surface of valve metal foil 11 serving as the anode, except for an area of the anode leading-out portion 11a, a solid electrolyte layer 16 is formed on the dielectric layer 15, and a cathode 12 is connected to the solid electrolyte layer 16. The solid electrolyte layer 16 is in proximity to principal surfaces of the valve metal foil 11 with the dielectric layer 15 intervening therebetween. One edge of the cathode 12 is elongated so as to form the cathode leading-out portion 12b. Both of the leading-out portions 11a and 12a extend in the same direction. Note here that a cathode conductive layer obtained by laminating a carbon layer and a silver paste layer, for example, in this order may be provided between the solid electrolyte layer 16 and the cathode 12. An adhesion layer made of, for example, a silver paste further may interposed between the cathode conductive layer and the cathode.

Figure 5A:
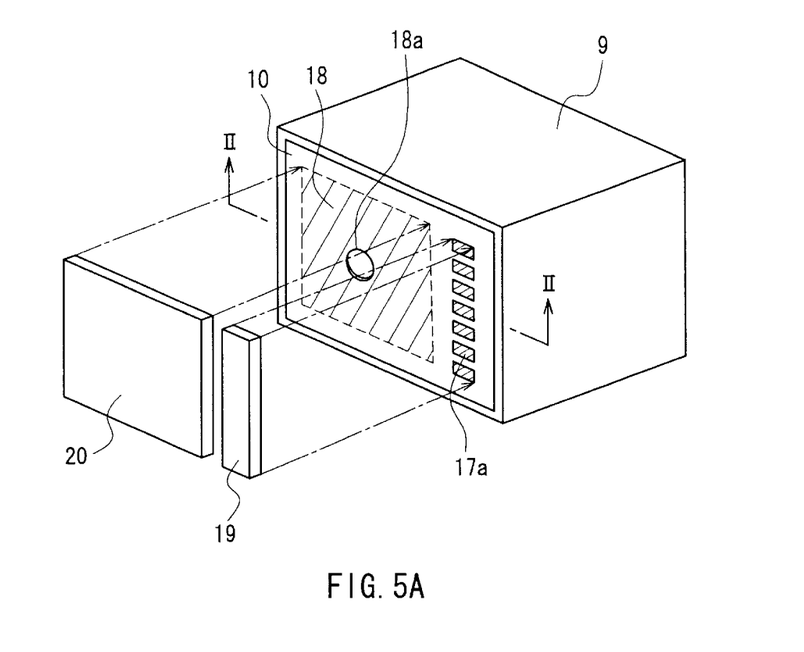
FIG. 5A is a perspective view of another capacitor according to Embodiment 2 of the present invention.
Figure 5B:
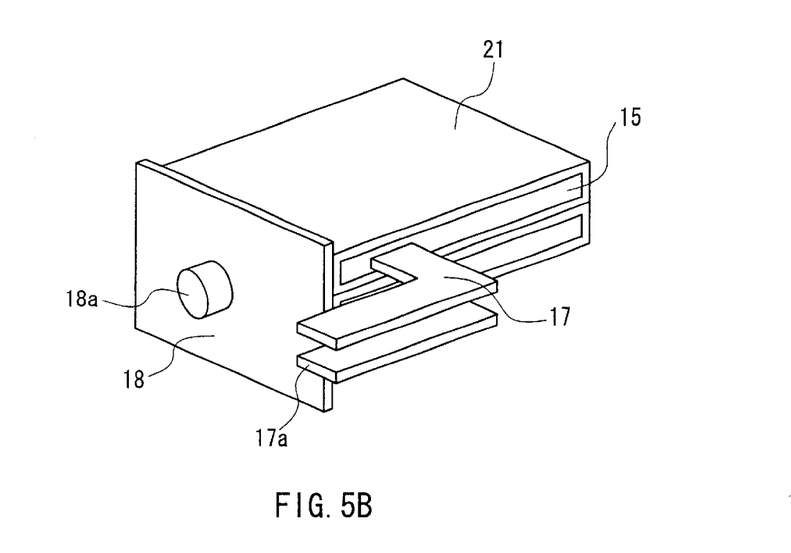
FIG. 5B is a perspective view showing a unit element that makes up the capacitor.

FIG. 5A is an external perspective view of another capacitor according to Embodiment 2 of the present invention, and FIG. 5B is a perspective view showing a construction of electrodes of the capacitor.

Also in this capacitor, a plurality of electrolytic capacitors, each being a unit element, are laminated and are arranged in a container 9, and an opening of the container 9 is sealed with a resin 10. However, in this electrolytic capacitor, a cathode conductive layer 21 is formed on a surface of a solid electrolyte layer by forming a carbon layer and a silver paste layer, for example, in this order, and the cathode conductive layer 21 and a single cathode leading-out portion 18a are joined to each other. The cathode leading-out portion 18 includes a flat-shaped base member and a protrusion 18a formed on a principal surface of this member, and this protrusion 18a protrudes from the resin 10 to be connected to the cathode terminal 20. Meanwhile, an anode leading-out portion 17a led from each of a plurality of anodes 17 has a bend in an L shape to be led out in the same direction as that of the cathode leading-out portion 18 so as to be connected to the anode terminal 19.

Note here that the cathode conductive layer 21 may be omitted from a connecting portion of each electrolytic capacitor, and the solid electrolyte layer may be connected directly to the cathode leading-out portion 18, as long as the omission does not cause any problem of electrical connection. Although the anode and the cathode are not laminated alternately in the embodiment shown in FIGS. 5A and 5B, the present invention is applicable to such an embodiment also.

Although this capacitor employs the cathode leading-out portion 18 provided with the protrusion 18a on the metal sheet, this protrusion 18a may be omitted.

Figure 6A:
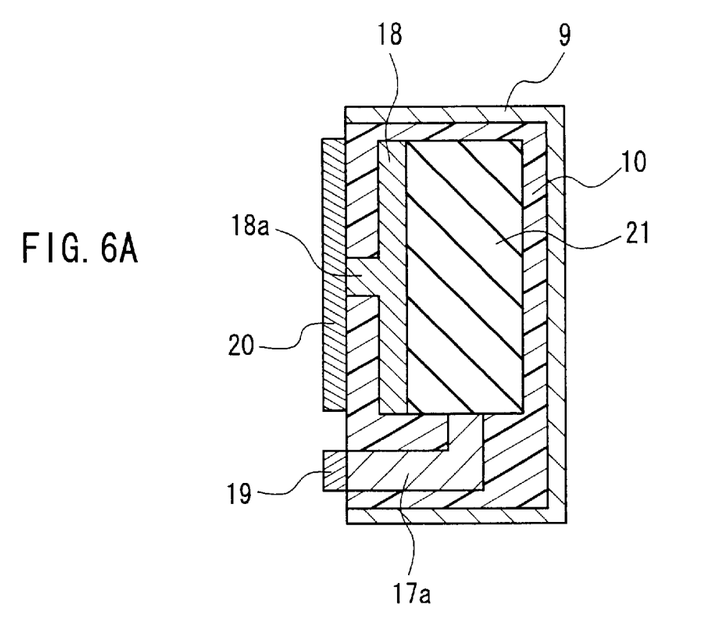
FIG. 6A is a cross-sectional view of the capacitor in FIG. 5A, taken along the line II—II.

FIG. 6A is a cross-sectional view taken along the line II—II of FIG. 5A.

As shown in FIG. 6A, the cathode leading-out portion 18 made of metal sheet is attached to cover a side surface of the unit capacitor element 21. A front end of the cathode terminal connecting portion 18a and a front end of the anode leading-out portion 17a are exposed from a surface of the resin 10 to be connected to the cathode terminal 20 and the anode terminal 19, respectively. These terminals 19 and 20 can be formed by, for example, plating or printing of an electroconductive paste.

In this capacitor, the flat-shaped cathode leading-out portion 18, which covers one side surface of the capacitor, prevents damaging substances contained in the environment, such as water and water vapor, from penetrating inside of the capacitor. The cathode leading-out portion 18 lengthens a path for the damaging substances to penetrate inside of the capacitor.

Figure 6B:
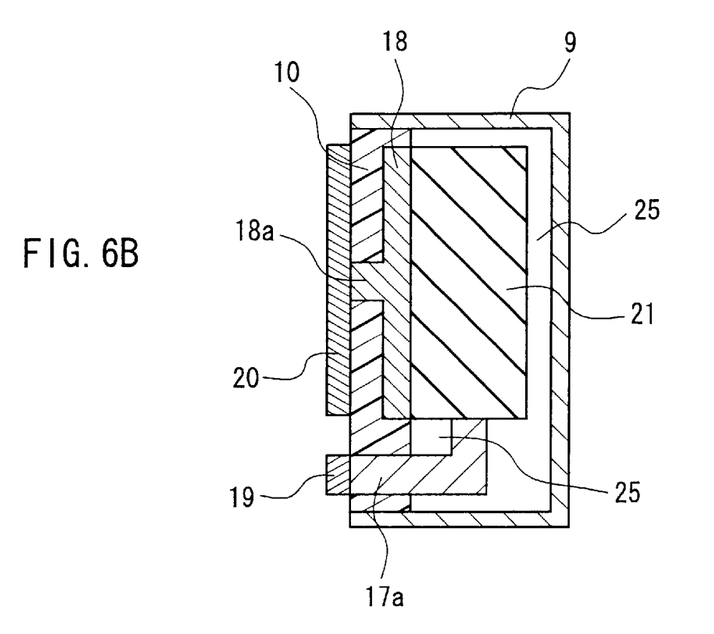
FIG. 6B is a cross-sectional view of still another capacitor according to Embodiment 2 of the present invention.

Although, in the capacitor shown in FIG. 6A, the inside of the container 9 is filled with the resin 10, only the opening portion of the container may be sealed with the resin so that space 25 is left inside of the container, as shown in FIG. 6B. The left space 25 further improves the reflow reliability after penetration of water and water vapor. More specifically, the opening may be sealed with a resin sheet. After sealing the opening with the resin sheet, a liquid-form resin further may be applied thereto.

Furthermore, instead of the container 9, the resin 10 may be molded using a mold. The resin 10 may be a resin-containing material that contains an inorganic material.

Embodiment 3

FIGS. 7A to 7D show one example of a process for manufacturing the capacitors according to the present invention.

Figure 7A:
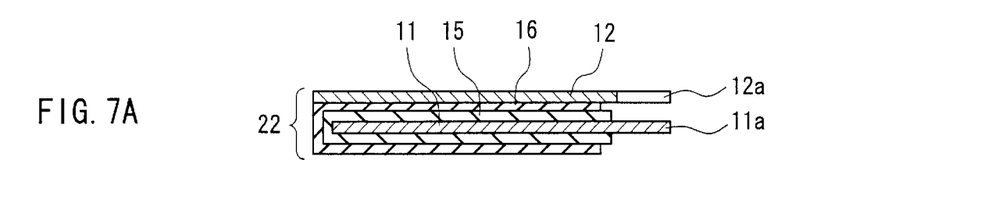
FIGS. 7A to 7D are each cross-sectional views showing a manufacturing process of a capacitor according to Embodiment 3 of the present invention.

The following describes one example of a method for manufacturing a unit element shown in FIG. 7A. Generally, sheet or foil having a capability of forming an anodic oxidation coating, selected from Al, Ta, Ti and Nb is used as the valve metal foil 11, and an example using Al foil will be described below.

Al foil cut into a strip of 3 mm in width is etched electrochemically in an aqueous solution containing hydrochloric acid so as to form Al etched foil serving as the valve metal foil 11. Anodic oxidation is conducted on a predetermined portion of this valve metal foil 11 in an aqueous solution containing an electrolyte such as ammonium adipate under a condition of, for example, 5 V for one hour, so that an anodic oxidation coating layer 15 is formed. A decreased level aqueous solution containing manganese nitrate is applied on a surface of this anodic oxidation coating layer 15, which is thermally decomposed under a condition, for example, at 300° C. for 20 minutes so as to form a manganese oxide layer. Thereafter, an electroconductive polymer layer made of polypyrrole is formed on the manganese oxide layer by electrolytic polymerization. The electrolytic polymerization is conducted, for example, in an aqueous solution containing 0.25 mol/liter of pyrrole and 0.1 mol/liter of alkylnaphthalene sulfonate soda under a condition of 2 mA/cm$^2$ of constant current (a current per an apparent unit area of the Al etched foil), where a stainless steel electrode provided close to the manganese oxide layer functions as an anode for the electrolytic polymerization. FIG. 7A shows the manganese oxide layer and the electroconductive polymer layer made of polypyrrole as a solid electrolyte layer 16. Further, a cathode 12 is connected electrically onto this electroconductive polymer layer. Before forming the cathode 12, a carbon layer and a silver paste layer are formed on a surface of the solid electrolyte layer 16 in this stated order to arrange a cathode conductive layer. Thus, a unit element 22 of, for example, 4 mm in length, 3 mm in width and with the rating of 2 V-25 μF can be obtained.

Figure 7B:
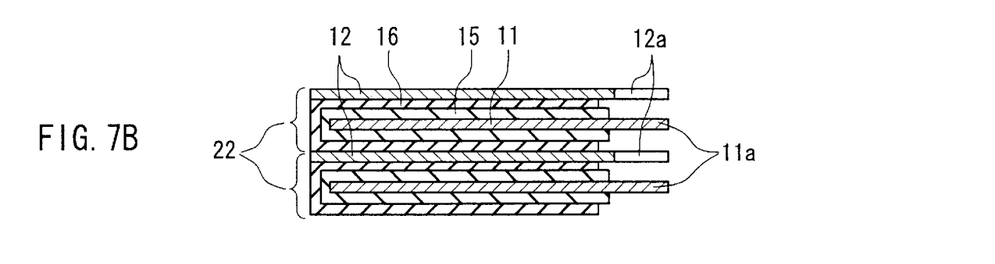

Next, as shown in FIG. 7B, a capacitor element is formed by laminating the required number of unit elements 22. Note here that the unit elements 22 are arranged so as to keep the anode leading-out portion 11a and the cathode leading-out portion 12a from overlapping with each other when looked down on from the top and so that these leading-out portions are led out in a same direction. The cross-section of the anode leading terminal 12a (without a hatching pattern) is not shown in the cross-section of FIG. 7B.

Figure 7C:
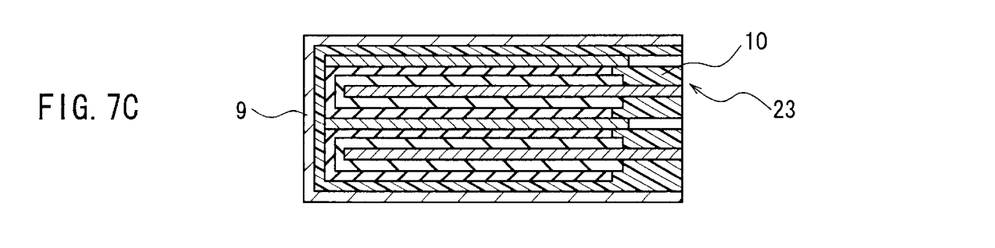

Subsequently, as shown in FIG. 7C, the capacitor element is put in a container 9, and the container 9 is sealed with a resin 10. A surface on which the resin 10 is exposed makes up a portion of an outer surface of the capacitor, together with each surface of the container 9. If the front end portions of the anode leading-out portion 11a and the cathode leading-out portion 12a are covered with the resin 10, the front end of each leading-out portion 11a and 12a is exposed on a leading surface 23. Although this description deals with an example where the unit element 22 is put in the container 9, the capacitor element can be sealed by resin molding and a resin potting method, without using the container 9.

Figure 7D:
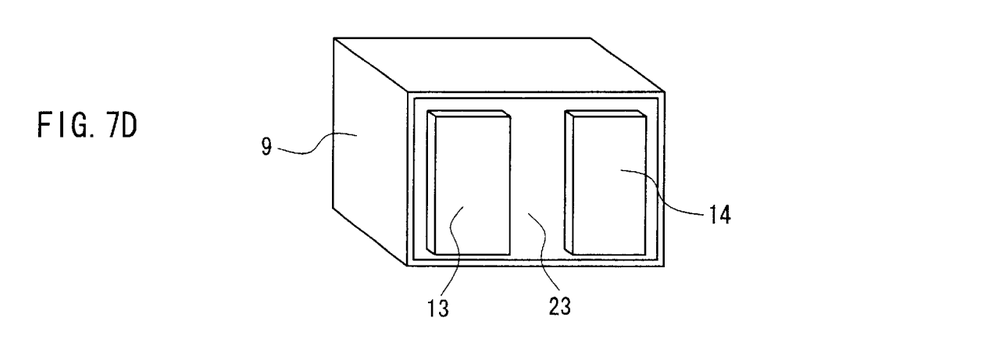

Furthermore, as shown in FIG. 7D, an anode terminal 13 and a cathode terminal 14 are formed so as to be connected to the anode leading-out portion 11a and the cathode leading-out portion 12a, respectively, that are exposed from the leading surface 23.

Note here that in order to isolate a portion for forming the solid electrolyte layer, an isolation layer made of an insulating tape, an insulating resin, etc., may be provided on a portion of the Al foil. The resin 10 may be a resin containing an inorganic material.

Although the above manufacturing method is described with reference to the capacitor shown in FIG. 4A as one example, the capacitor shown in FIG. 5A also can be manufactured in the same way.

Note here that instead of filling the inside of the container 9 with the resin 10 entirely, only the opening portion of the container 9 may be sealed with a resin sheet or a combination of a resin sheet and a liquid-form resin so that space is left inside of the container.

EXAMPLES

A multilayer ceramic capacitor having the configuration shown in FIG. 1 was manufactured. As a dielectric, a material containing barium titanate as a main component was used, and as an anode and a cathode, nickel was used. The manufactured multilayer ceramic capacitor was 5.7 mm in length (L), 5.0 mm in width (W) and 2.5 mm in height (T). Both of the anode terminal and the cathode terminal were formed in the size of 2 mm×2.2 mm on a surface of 5.7 mm×2.5 mm in size.

The capacitance of the thus manufactured multilayer ceramic capacitor (capacitor A) was approximately 100 $\mu$F, which was measured at the frequency of 120 Hz, and ESR at 100 kHz was 3 m$\Omega$. The rating voltage was 6.3 V. However, it was difficult to measure the ESL of the capacitor A using a general-purpose LCR meter, because the capacitor A had a specific arrangement of terminals.

For comparison, a multilayer ceramic capacitor was manufactured in the same way as above, except that the leading directions of the terminals were changed. An anode terminal and a cathode terminal were formed on opposed surfaces of 5.7 mm×2.5 mm in size.

The capacitance of the thus manufactured conventional multilayer ceramic capacitor (capacitor B) was approximately 100 $\mu$F, which was measured at the frequency of 120 Hz, and ESR at 100 kHz was 2.8 m$\Omega$. The rating voltage was 6.3 V. As a result of the measurement using "impedance analyzer 4292A" made by Agilent Technologies, the ESL of the capacitor B was 3.0 nH.

Subsequently, an Al electrolytic capacitor having the configuration shown in FIG. 4 was manufactured. As a solid electrolyte material, poly-3,4-ethylenedioxythiophene was used. On a surface of the solid electrolyte layer, a carbon layer and a silver paste layer were formed, and a sheet-form cathode leading-out portion made of Ni was connected via this silver paste layer. The size was 7.3 mm (L), 4.3 mm (W) and 4.1 mm (T), and both of the anode terminal and the cathode terminal were formed in the size of 2.2 mm×3.5 mm on a surface of 7.3 mm×4.1 mm in size. The capacitance of the thus manufactured multilayer solid electrolytic capacitor (capacitor C) was approximately 470 $\mu$F, which was measured at the frequency of 120 Hz, and ESR at the frequency of 100 kHz was 5 m$\Omega$. The rating voltage was 2 V. It was difficult to measure the ESL of the capacitor C using a general-purpose LCR meter, because the capacitor C had a specific arrangement of terminals.

For comparison, a multilayer solid electrolytic capacitor was manufactured in the same way as above, except that the leading directions of the terminals were changed. An anode terminal and a cathode terminal were formed on opposed surfaces of 7.3 mm×4.1 mm in size. The capacitance of the thus manufactured multilayer solid electrolytic capacitor (capacitor D) was approximately 470 $\mu$F, which was measured at the frequency of 120 Hz, and ESR at 100 kHz was 4.9 m$\Omega$. As a result of the measurement using the same device as above, the ESL of this capacitor was 2.5 nH.

Sine the capacitors A and C have a specific arrangement of the terminals, it is difficult to measure their ESL using a general-purpose LCR meter. Therefore, when these capacitors were used as a secondary capacitor in a switching power supply, the ripple voltage due to the ESL was decreased and excellent properties as the switching power supply were obtained, as compared with the case using corresponding capacitors for comparison. When determining the ESL values from the ripple voltage values due to the ESL, 1.4 nH and 1.6 nH were obtained for the capacitors A and C, respectively.

In the case of the conventional two-terminal multilayer ceramic capacitor, even when the capacitor was miniaturized to 2.0 mm (L), 1.2 mm (W) and 0.5 mm (T) in size, the ESL value is approximately 1.7 nH.

As described above, the capacitors according to the present invention realize low ESL and low ESR at high frequencies.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A capacitor comprising:
    anodes and cathodes that each are laminated alternately with at least a dielectric layer intervening therebetween;
    anode leading-out portions;
    at least one cathode leading-out portion;
    an anode terminal; and
    a cathode terminal,
    wherein the anodes are connected electrically to the anode leading-out portions, and the cathodes are connected electrically to the at least one cathode leading-out portion,
    the anode leading-out portions and the at least one cathode leading-out portion are led out in a predetermined directions;
    the anode terminal and the cathode terminal are made of flat plates and formed at least on a predetermined surface of the surfaces of the capacitor; and the anode leading-out portions are connected to the anode terminal and the at least one cathode leading-out portion is connected to the cathode terminal.

2. The capacitor according to claim 1, wherein at least one selected from the anode terminal and the cathode terminal is formed so as to extend from the predetermined surface to an adjacent surface that is adjacent to the predetermined surface.

3. The capacitor according to claim 1,
wherein the anodes and the cathodes are flat plates having principal surfaces in a predetermined shape, and
edge surfaces of the flat plates partially protrude in the predetermined direction so as to form the anode leading-out portions or the at least one cathode leading-out portion.

4. The capacitor according to claim 3, wherein the predetermined shape is a rectangle.

5. The capacitor according to claim 3, wherein the anode leading-out portions and the at least one cathode leading-out portion are led out so as not to overlap with each other, when viewed from a direction perpendicular to the principal surface.

6. The capacitor according to claim 1,
wherein the anodes and the cathodes are put in a container having an opening, and
the anode leading-out portions and the at least one cathode leading-out portion are led out from the opening.

7. The capacitor according to claim 6, wherein the opening is sealed with a material containing a resin.

8. The capacitor according to claim 7, wherein space is present inside of the container.

9. The capacitor according to claim 1, wherein the anodes and the cathodes are each laminated alternately with at least a solid electrolyte layer as well as the dielectric layer intervening therebetween.

10. The capacitor according to claim 9,
wherein each of the anodes has a pair of principal surfaces, on each of which the dielectric layer is formed,
the solid electrolyte layer is formed to be in contact with the dielectric layer and on each of the pair of the principal surfaces via the dielectric layer,
each of the cathodes is arranged so as to be connected electrically to the solid electrolyte layer, and
a plurality of unit elements, each being made up of the anode, the dielectric layer, the solid electrolyte layer and the cathode, are laminated.

11. The capacitor according to claim 10, wherein the at least one cathode leading-out portion is a single member that is connected to the cathodes that constitute the plurality of unit elements.

12. The capacitor according to claim 9, wherein anode leading-out portions are formed to have a bend in an L shape to be led out.

13. A capacitor comprising:
a plurality of unit elements that are laminated, each of the unit elements comprising an anode having a pair of principal surfaces, a dielectric layer formed on each of the pair of principal surfaces and a solid electrolyte layer formed on each of the pair of principal surfaces via the dielectric layer;
anode leading-out portions; and
a cathode leading-out portion,
wherein the anodes are connected electrically to the anode leading-out portions and the solid electrolyte layers are connected electrically to the cathode leading-out portion,
the anode leading-out portions and the cathode leading-out portion are led out in a predetermined direction, and
the anode leading-out portions are connected to an anode terminal, and the cathode leading-out portion is connected to a cathode terminal.

14. The capacitor according to claim 13, wherein the anode leading-out portions are formed to have a bend in an L shape to be led out.

15. A capacitor comprising:
anodes and cathodes that each are laminated alternately with at least a dielectric layer intervening therebetween;
at least one first anode leading-out portion;
at least one second anode leading-out portion;
at least one first cathode leading-out portion;
at least one second cathode leading-out portion;
a first anode terminal;
a second anode terminal;
a first cathode terminal; and
a second cathode terminal,
wherein the anodes are connected electrically to the at least one first anode leading-out portion and the at least one second anode leading-out portion, and the cathodes are connected electrically to the at least one first cathode leading-out portion and the at least one second cathode leading-out portion,
the at least one first anode leading-out portion, the at least one second anode leading-out portion, the at least one first cathode leading-out portion and the at least one second cathode leading-out portion are led out in a predetermined direction, and
the at least one first anode leading-out portion is connected to the first anode terminal, the at least one second anode leading-out portion is connected to the second anode terminal, the at least one first cathode leading-out portion is connected to the first cathode terminal, and the at least one second cathode leading-out portion is connected to the second cathode terminal.

16. The capacitor according to claim 15, wherein the first anode terminal, the second anode terminal, the first cathode terminal and the second cathode terminal are exposed at least from a predetermined surface of the surfaces of the capacitor.

17. The capacitor according to claim 16, wherein at least one of the first anode terminal, the second anode terminal, the first cathode terminal and the second cathode terminal is formed so as to extend from the predetermined surface to an adjacent surface that is adjacent to the predetermined surface.

18. The capacitor according to claim 15,
wherein the anodes and the cathodes are flat plates having principal surfaces in a predetermined shape, and
two portions of an edge surface of each of the flat plates protrude in the predetermined direction so as to form the first anode leading-out portion and the second anode leading-out portion or the first cathode leading-out portion and the second cathode leading-out portion.

19. The capacitor according to claim 18, wherein the first anode terminal, the second anode terminal, the first cathode terminal and the second cathode terminal are led out so as not to overlap with each other, when viewed from a direction perpendicular to the principal surface.

* * * * *

UNITED STATES PATENT AND TRADEMARK OFFICE
CERTIFICATE OF CORRECTION

PATENT NO. : 6,661,644 B2
DATED : December 9, 2003
INVENTOR(S) : Shimada et al.

It is certified that error appears in the above-identified patent and that said Letters Patent is hereby corrected as shown below:

Column 10,
Line 63, "directions" should read -- direction --

Column 11,
Line 52, "wherein anode" should read -- wherein the anode --

Signed and Sealed this

Eighth Day of June, 2004

JON W. DUDAS
*Acting Director of the United States Patent and Trademark Office*